3 Sheets—Sheet 1.
L. GODDU,
Assignor by mesne assignments to The American Cable Screw Wire Co.
MACHINES FOR NAILING BOOT AND SHOE SOLES.
No. 7,357. Reissued Oct. 24, 1876.
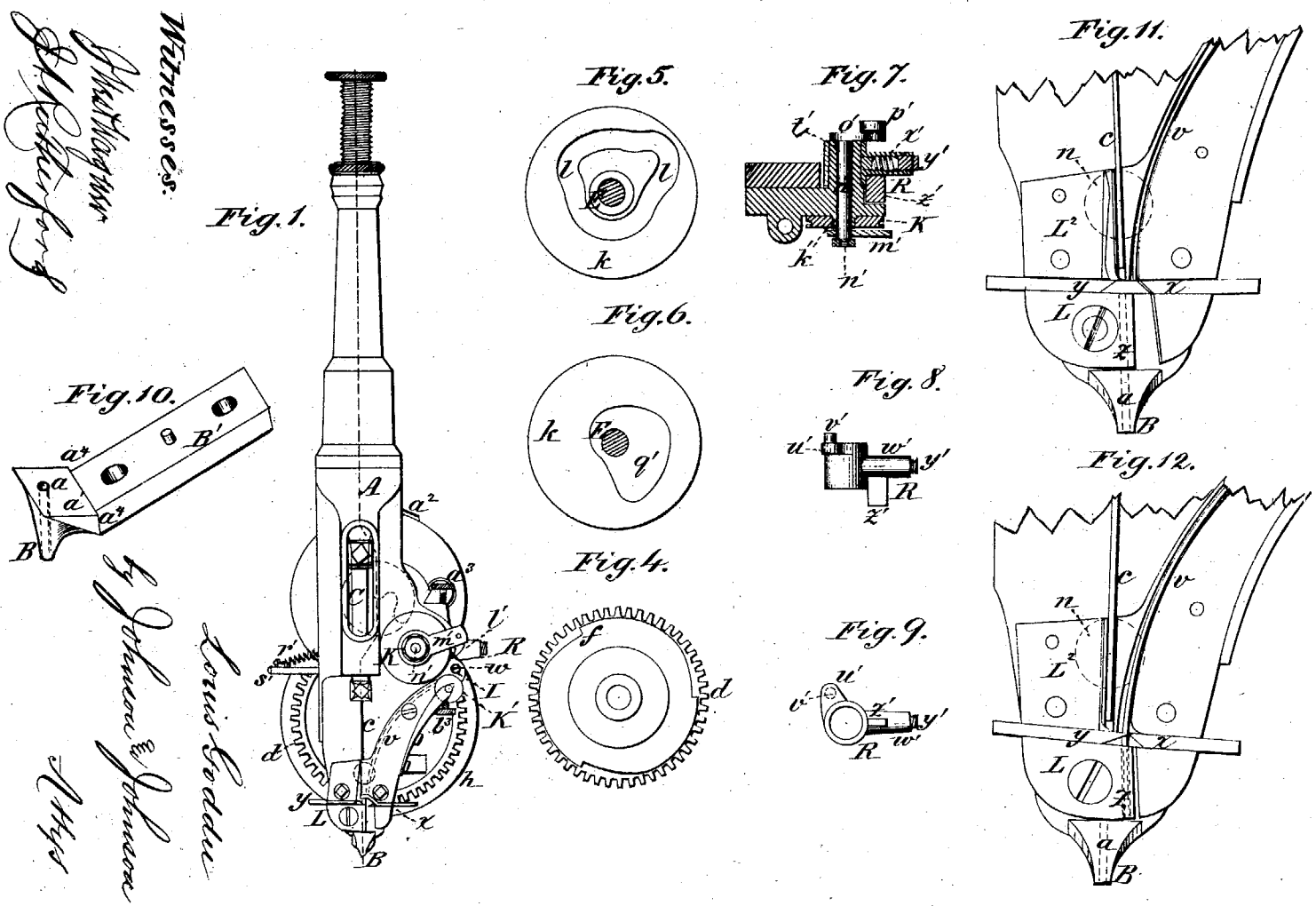
Witnesses.
J. Wm. Wagner
J. H. Rutherford
Louis Goddu
by Johnson and Johnson
Attys

L. GODDU,
Assignor by mesne assignments to The American Cable Screw Wire Co.
MACHINES FOR NAILING BOOT AND SHOE SOLES.
No. 7,357. Reissued Oct. 24, 1876.
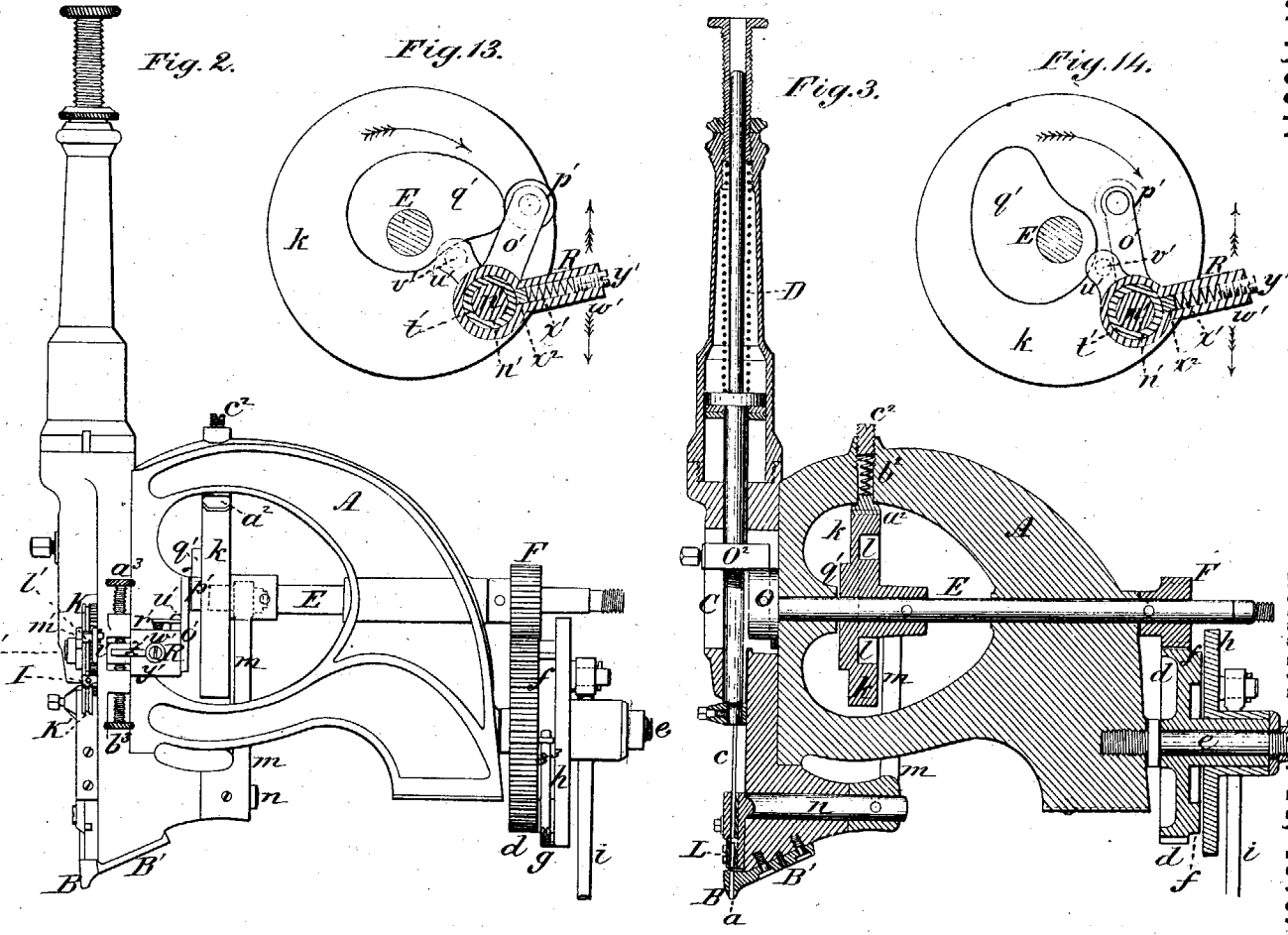
*Witnesses:*
J. West Wagner.
J. H. Rutherford
Louis Goddu
by Johnson and Johnson
Attys 3 Sheets—Sheet 3.
L. GODDU,
Assignor by mesne assignments to The American Cable Screw Wire Co.
MACHINES FOR NAILING BOOT AND SHOE SOLES.
No. 7,357. Reissued Oct. 24, 1876.
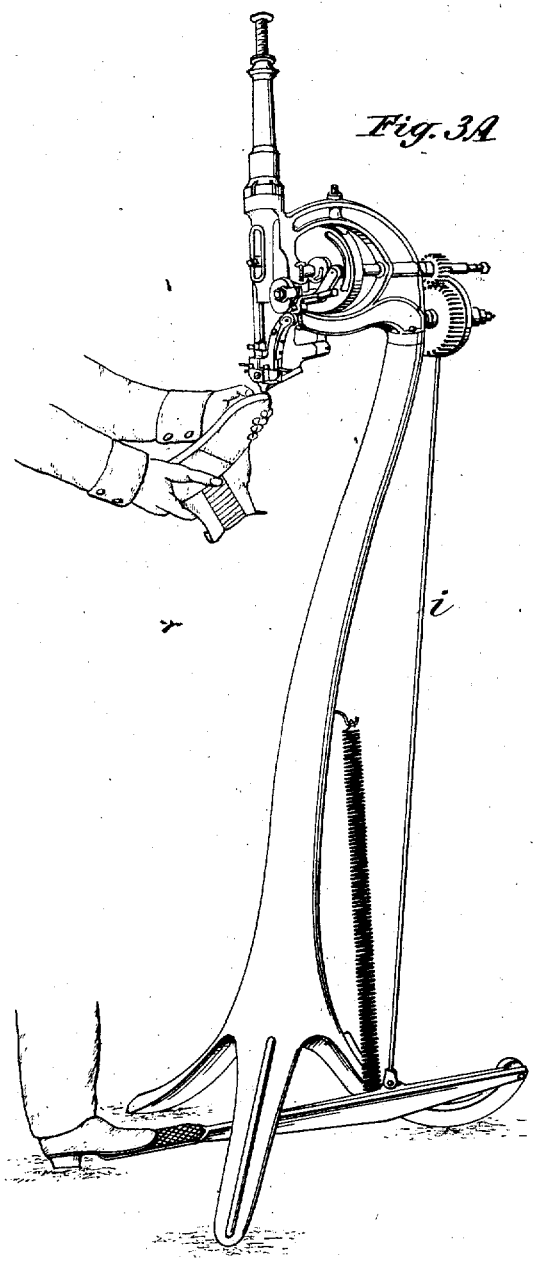
Witnesses;
J. Wm. Wagner
J. A. Rutherford
Inventor;
Louis Goddu
by Johnson & Johnson
Attys

UNITED STATES PATENT OFFICE

LOUIS GODDU, OF BOSTON, MASS., ASSIGNOR, BY MESNE ASSIGNMENTS, TO THE AMERICAN CABLE SCREW WIRE COMPANY.

IMPROVEMENT IN MACHINES FOR NAILING BOOT AND SHOE SOLES.

Specification forming part of Letters Patent No. 122,377, dated January 2, 1872; reissue No. 7,357, dated October 24, 1876; application filed September 11, 1876.

DIVISION A.

*To all whom it may concern:*

Be it known that I, LOUIS GODDU, formerly of the Dominion of Canada, but now a citizen of the United States, and residing in Boston, in the county of Suffolk and State of Massachusetts, have made a new and useful invention or Improvement in Machines for Tacking Shoe-Soles or Various other Articles with Wire; and I do hereby declare the same to be fully described in the following specification and represented in the accompanying drawings, of which—

Figure 1 is a front elevation, Fig. 2 a side view, and Fig. 3 a vertical longitudinal section, of the head of a tacking-machine with my improvements or invention; and Fig. 3 A represents a view, in perspective, of the head as mounted upon its standard, and connected with the operating-treadle, and showing the manner of presenting and supporting the shoe to the nose by hand.

Such other figures or drawings as may be necessary to a full or proper illustration of my invention will be hereinafter referred to and described.

The machine exhibited by the said drawings is analogous to that patented to me November 23, 1869, No. 97,192, and reissued December 14, 1875, in the particulars of having a cutter carried by an unintermittently-oscillating transferrer, into which the wire is fed, the nail severed and transferred in position to receive the action of the driver, and in connection with which feeding mechanism is employed to feed the wire to the cutters and transferrer. The said patented machine, however, is adapted to be grasped and operated by the hands, and fed over the work; whereas my present machine is adapted for operation by treadle, and to allow the work to be presented by the hands, and contains new and useful combinations and mechanism for carrying out a new method of tacking shoe-soles to the lasted shoe preparatory to their permanent nailing or sewing.

The special object for which the present machine is designed is the fixing of soles or welts in place by a few nails or tacks preparatory to their being regularly pegged, nailed, or sewed to the upper of the shoe, an attendant presenting, as may be required, the lasted shoe to the nose of the machine, and at the same time operating the pedal of the machine by his foot, so as to put the machine in operation, and cause it to drive a tack through such part of the sole or stock where it may be desirable to have one inserted. Heretofore soles have been tacked or fastened slightly by hand before the last was removed to sew on the sole, or before it was permanently fastened with pegs or screw-wire. If this were not done the sole would get out of place in sewing or nailing.

From eight to ten nails or tacks, or more, are required to secure a sole so as to hold it properly in place for nailing or sewing. By my machine a man can do from eight hundred to one thousand pairs daily.

The nose of the machine is made small, so as to enter the channel of the sole in sewed work; and being free from feed device, edge-guide, or support, the operator takes the lasted shoe in his hands, places the shoe in the proper position thereon, presents it to the nose, and operates the treadle, so as to set the machine in motion, and drives the tack, and so continues the operation, using the upward pressure of his hands to keep the sole close to the nose until the sole is tacked. In this operation the sole is fed by hand, first presenting the toe and then the heel, or wherever a nail or tack is needed.

A denotes the stock, head, or frame for supporting the operative parts, and it terminates in or is provided with the guide-nose B, which has a vertical passage, *a*, leading through it. The nose is small, and projects a sufficient distance down from the head to enter the channel and allow the sole to be moved along freely over it, as shown in Figs. 3 A and 10, which latter is a perspective view of the nose detached. Through the passages *a* the nail or tack, after being severed from the wire, is driven or forced by the driver, (shown at *c*.) The said driver is fixed in the lower part of a carrier or vertical slide-rod, C, arranged in guides in the frame or stock A, and provided with a spring, D, the purpose of which is to depress the carrier-rod after each elevation of it, such depression being with power sufficient to cause the driver to force the nail or tack into the article into which it may be required to be driven.

Within the frame or stock A, and disposed therein as represented, is the main horizontal shaft E, carrying a pinion, F, on its rear end. This pinion engages with a gear, *d*, arranged on a stationary arbor, *e*.

There is fixed to the gear *d*, on one side of it, a ratchet-wheel, *f*, (see Fig. 4, which is a side view of the ratchet wheel and gear,) with which a draw-pawl, *g*, Fig. 2, applied to one side of a wheel, *h*, and provided with an actuating-spring, $s^3$, operates. The wheel *h* turns freely on a sleeve of said ratchet-gear, and, while in operation, has a reciprocating rotary motion, effected by a pedal connected with the wheel by a rod, *i*, Figs. 3 and 3 A, pivoted to the two, a spring being used to elevate the pedal and rod, as shown in Fig. 3 A. An entire revolution is imparted to the shaft E during each downward movement of the pedal. A cam brake-wheel, *k*, (shown in side view in Fig. 5,) fixed upon the shaft E, receives in its cam-groove *l* a friction-roll projecting from one side of an arm, *m*, such arm being mounted upon and extending upward from the rear end of a horizontal shaft, *n*, fitted in bearings in the lower part of the head, and to whose front end the transferrer L is fixed, the latter deriving its intermittent oscillating movements from the said shaft, arm, and cam. This transferrer is secured to the lower end of a plate, $L^2$, Figs. 11 and 12, which depends from said shaft *n*, and has its movement close to the face of the head. The transferrer proper has the passage *z*, into which the wire is fed and supported while the nail or tack is being cut off, and which passage is brought, by the action of the cam *l*, coincident with the nose-guide *a* and the driver when the nail or tack is to be driven. The transferrer, therefore, is arranged to operate between the nose-guide and the driver, in order that the nose may project free of any hinderance for the presentation and pressure of the sole thereagainst.

There is fixed on the shaft E, at its front end, a cam or lifter, O, to act against a nut, $O^2$, to effect the elevation of the driver-carrier C at the proper times, and to allow it to be driven down by the spring D, arranged in the turret.

This nut $O^2$ is screwed upon a thread on the driver-bar to allow said nut to be adjusted, and it is clamped by a screw, so that neither the nut or bar can turn as the bar is operated by the lifter. A collar on the driver-bar, cushioned with leather washers, acts upon a shoulder in the head, and limits the descent of the driver, the washers preventing too severe blows upon the collar. These washers are renewed as often as is necessary.

The driver *c* is fitted into a hole drilled in the end of the bar an inch or more in length, and a narrow slit is cut across the end for about the same length, over which slitted end a collar is fitted and provided with a screw, which presses the two ends formed by the slits together, and thus holds the driver at any point, and allows it to be removed if broken and another put in.

The wire from which the nails or tacks are to be successively cut is led through a passage, *w*, in a fixed guide, I, and thence between the guide K′ and the milled or toothed periphery of a feed-wheel, K, thence through a conduit, *v*, to and past the cutters, one of which is fixed horizontally at the side, forming the wire-conduit *v*, and the other to the transferrer. From the conduit *v* the wire passes into passage *z* of the transferrer The said transferrer carries the movable cutter *y* on a line with the top of its passage *z*, which, operating in conjunction with the stationary cutter *x*, serves at the proper time to sever a tack from the wire. By the oscillation of the transferrer L toward the fixed cutter *x*, the wire will be cut, or the nail or tack will be severed from it, by the cutters, as shown in Fig. 12, which is an enlarged view of the transferrer, cutters, and nose; and subsequently—that is, by the oscillation of the transferrer away from the fixed cutter—the nail or tack will be moved directly over and in line with the guide-nose passage *a*, ready to be driven by the driver, as in Fig. 11, which is a similar view to Fig. 12. By this construction and operation the nail or tack will be cut by a distinct movement of the transferrer in one direction, and, by a reverse movement, bring the tack over the nose-guide. These two movements are effected by the cam *l*, and they are, of course, timed with the action of the driver and the feed of the wire.

There is applied to the periphery of the cam-wheel *k* a friction-brake or presser, $a^2$, which, arranged in the frame, has a spring, $b^2$, for forcing it against said wheel, the elastic force or pressure of the spring being increased or diminished by a screw, $c^2$, screwed into the frame or head A, and against the end of the spring. This friction-brake is to prevent the cam-wheel from being revolved by its momentum beyond what may be necessary for its successful action. The brake $a^2$ is also to hold the shaft E from revolving while the pawl-carrying wheel *h* is being moved backward, so as to slip the pawl *g* over the ratchet-wheel *f*. The feed-wheel K revolves loosely upon a short arbor, *k′*, Fig. 7, projecting from the head, and through which the ratchet-armed shaft *n′* extends.

A ratchet or pawl, *l′*, carried by an arm, *m′*, and arranged with the toothed periphery of the feed-wheel, operates such wheel. The arm *m′* is fixed to and projects radially from the outer end of the shaft *n′*, which has on its rear end a radial arm, *o′*, carrying a friction-roll, *p′*, to act against the periphery of a cam, *q′*, fixed on the outer side of the cam-wheel *k*, the shape of the cam *q′* being shown in Figs. 6, 13, and 14, and its action on the arm *o′* oscillates the shaft *n′*, and moves the feed-wheel by the ratchet-pawl. These is connected to the arm *o′* a spring, *r′*, Fig. 1, which is fastened to a projection, $s^1$, from the frame or head. This spring draws and keeps the friction-roll closely up to the cam. Fig. 7 is a horizontal section taken through the axis of the double-armed shaft $n'$ and the contiguous parts, showing the sleeved lever, its friction-brake, and the double-armed shaft $n'$. There projects backward from the frame A, and concentric with the shaft $n'$, a tubular arbor, $t'$, Figs. 7, 13, and 14, which constitutes the fulcrum and bearing of the sleeved lever R, top and side views of such lever being given in Figs. 8 and 9, and sections in Figs. 13 and 14. From the short arm $w'$, at the inner end of the sleeve of such lever, a stud, $v'$, is extended to bear against the inner side of the arm $o'$, and serves as a stop for the latter. The handle $w'$ or lever R is hollow or chambered to receive a spring, $x^1$, which is held in place in the arm by a screw, $y'$, screwed therein and against the outer end of the spring $x^1$. The inner end of the spring bears against the sleeve-arbor $t'$ by an intervening friction-seat, $x^2$, Figs. 13 and 14, and its force is regulated by the screw $y'$, and it serves as a brake to hold the sleeve-lever in its adjustment upon the fixed arbor $t'$, and which adjustment governs, by the short arm $w'$, the extent of movement of the long arm $o'$, and the feed of the pawl. From said stop-lever an arm, $z'$, extends between the ends of two screws or adjustable stops, $a^3$ $b^3$, arranged in the frame A in line with each other, so as to limit the movement of said arm. The purpose of the stop-lever and the adjustable stops $a^3$ $b^3$ is to regulate the extent of movement of the arm $o'$ toward the cam $q'$, and as a consequence the feeding of the wire, in order to cause the nail or tack cut off and driven to have any desirable length.

By taking hold of the arm $w'$ or lever R an attendant moves the arm $z'$ between the stops more or less, as may be requisite, to vary the feed of the wire, the spring of the lever sufficing to hold, by the friction of a bearing-piece, $x^2$, upon the sleeve-arbor $t'$, the lever in the position in which it may be so placed.

By turning the lever down, Figs. 13 and 14, the stud $v'$ acts upon the inner side of the arm $o'$, and keeps it farther away from the cam $q'$, as in Fig 14, and thus lessens the movement of the feed-wheel and shortens the length of the nail or tack; but by raising the lever the stud $v'$ is carried away from the arm $o'$, and the latter thereby allowed to come nearer to the lesser-acting part of the cam $q'$, and thus increase the movement of the feed-wheel and the length of the nail or tack, and this adjustment of the lever is governed within fixed limits by the adjustable stops.

Figs. 11 and 12 represent front views of the transferrer and cutter devices in different positions, the cutter-securing plates being removed, in which Fig. 11 shows the transferrer in its outward movement to bring its passage $z$ in line with the driver $c$, and Fig. 12 shows the transferrer in its inward movement to receive the wire, and also to bring the cutters together to sever the wire. The fixed guide I for the wire is arranged just outside and between the feed-wheel K and a guide-roll, K', to give a proper support to the wire in being drawn into the fixed guide $v$, which terminates just on the under side of the feed-wheel.

Figs. 13 and 14 show sectional views of the sleeved lever R and its short stop-arm $w'$ $v'$, and the relation it occupies to the arm $o'$ of the ratchet-shaft $n'$, in order to adjust and hold said arm $o'$ away from the lesser-acting part of the cam $q'$, as in Fig. 14, to diminish the feed-movement received by the arm $o'$ from the feed-operating cam.

The spring $r'$ holds the arm $o'$ up to the cam, except when prevented from so doing by the stop-stud $u'$, adjusted to bear against the arm $o'$, as in Fig. 14, to limit the inward movement of the latter.

The guide-nose B, as shown in Fig. 10, projects from the end of a bar, B', which is bolted into a seat formed in the under side of the head, in an upwardly-inclined position, the top face $a^1$ of the nose end being level, and the shoulders $a^4$ $a^4$ keeping it firmly in place, while the nose-bar B' inclines upward out of the way of the nose, and leaves it free for use, as before stated. The turret is screwed upon the head A, to allow it to be removed for adjusting and renewing the leather washers of the driver-bar.

It will be observed that the lever R and the adjustable stops $a^3$ $b^3$ afford the means for determining the maximum and minimum length of the tack, so that a definite length of nail or tack can be cut off and driven—that is, it will not exceed or fall short of a fixed length; and this is effected by moving said lever as far up or down as possible between said stops, while at the same time this adjustment may be varied by the stops to give different lengths of tacks within such limits, and during the operation of inserting the tacks in the shoe against the upward pressure of the operator's hands against the nose, which presents the tack.

I claim—

1. The sleeved hand-lever R, provided with a stop-arm, $w'$ $v'$, in combination with the feed mechanism, consisting of the double-crank ratchet-shaft $n'$ $m'$ $o'$, pawl $l'$, the loose feed-wheel K, and the feed-operating cam $q'$ on the operating-shaft, said sleeved lever being loose upon the fixed arbor for independent adjustment, to vary the feed of the wire and the length of the nail or tack cut therefrom, as herein set forth.

2. The sleeved hand-lever R, provided with an arm, $z'$, and having an independent adjustment in relation to the feed double-armed shaft $n'$, in combination with adjustable stops $a^3$ $b^3$ of the frame and the feed mechanism, for the purpose stated.

3. The combination, with the sleeved hand-lever R, provided with the stop-arm $w'$, and having an independent adjustment in relation to the feed-shaft $n'$ of the presser-spring $x^1$, acting upon the sleeve-arbor $t'$ of said shaft, and the adjusting-screw $y'$, to hold the lever and its stop-arm $u'$ in its adjustment with respect to the feed ratchet-armed shaft $m'$ $n'$ $o'$, and the cam $q'$, as herein set forth.

4. The combination, with the transferrer L, its shaft $n$, connecting-arm $m$, and operating-cam $l$, of the brake-wheel $k$ $a^2$, to prevent the cam $q'$ from being carried beyond its proper action by its momentum.

5. The combination, with feed mechanism and its operating-cam $q'$, of the brake-wheel $k$ $a^2$ upon the operating-shaft, as and for the purpose stated.

6. The combination, with the brake cam-wheel $k$, the transferrer L, and the feeding devices, of the friction-brake $a^2$, its spring $b^2$, and adjusting-screw $c^2$, for the purpose stated.

7. The oscillating transferrer L, arranged between the nose-guide B and the driver $c$, and combined therewith and with the cutters and the wire-guide $v$, for operation as described.

8. The combination, with the feed-wheel K, the roll K′, and the fixed wire-guide $v$, of the fixed guide I, arranged in relation to these parts, as and for the purpose described.

9. The friction-brake $a^2$ and the brake cam-wheel $k$, in combination with the gears F $d$, ratchet-wheel $f$, reciprocating pawl $g$, and treadle-rod $i$, applied to the operating-shaft E, as and for the purpose set forth.

10. The sleeve-arbors $k'$ $t'$ of the frame, in combination with the feed-wheel K, the sleeved lever R, and the double-armed ratchet-shaft $n'$, constructed and arranged for operation as herein set forth.

11. The nose B, projected from the end of an upwardly-inclined bar, B′, and having the level face $a^1$ and the vertical passage $a$, constructed and combined for use with the head and transferrer, as herein set forth.

In testimony whereof I have affixed my signature in the presence of two witnesses.

LOUIS GODDU.

Witnesses:
N. S. HOTCHKISS,
GEO. T. ANGELL.